United States Patent [19]

Tsujii

[11] Patent Number: 4,912,294
[45] Date of Patent: Mar. 27, 1990

[54] METHOD OF CONTROLLING ELECTRODE TIP OF WELDING GUN IN AUTOMATIC WELDING MACHINE

[75] Inventor: Gen Tsujii, Sayama, Japan
[73] Assignee: Honda Giken Kogyo Kabushiki Kaisha, Tokyo, Japan
[21] Appl. No.: 300,888
[22] Filed: Jan. 24, 1989
[30] Foreign Application Priority Data
  Jan. 26, 1988 [JP] Japan .................................. 63-13700
[51] Int. Cl.⁴ ........................... B23K 9/28; B23K 9/32
[52] U.S. Cl. .................................. 219/86.24; 219/86.8
[58] Field of Search ................... 219/86.24, 86.25, 86.8
[56] References Cited

U.S. PATENT DOCUMENTS 4,531,041  7/1985  Larsson .................................. 219/90
4,789,769 12/1988  Warner .............................. 219/86.25
4,794,221 12/1988  Takabe et al. ............... 219/86.25 X Primary Examiner—George H. Miller, Jr.
Attorney, Agent, or Firm—Armstrong, Nikaido, Marmelstein, Kubovcik & Murray

[57] ABSTRACT

The opening degree of the two arms of a welding gun movable by a robot to a plurality of welding spots, each of the arms being equipped with an electrode tip, is detected when the arms are closed with no work clamped between them and compared with a lower-limit opening degree value. The lower-limit opening degree value is previously set to be equal to the opening degree experienced when the electrode tips are reduced to their lower usability limit. The comparison determines if the tips need to be replaced. After replacement, the opening degree observed with the gun closed with no work clamped between the tips is compared to an upper-limit opening degree value, previously set, to operate an alarm if a defective tip or an incorrectly mounted tip is present.

2 Claims, 2 Drawing Sheets

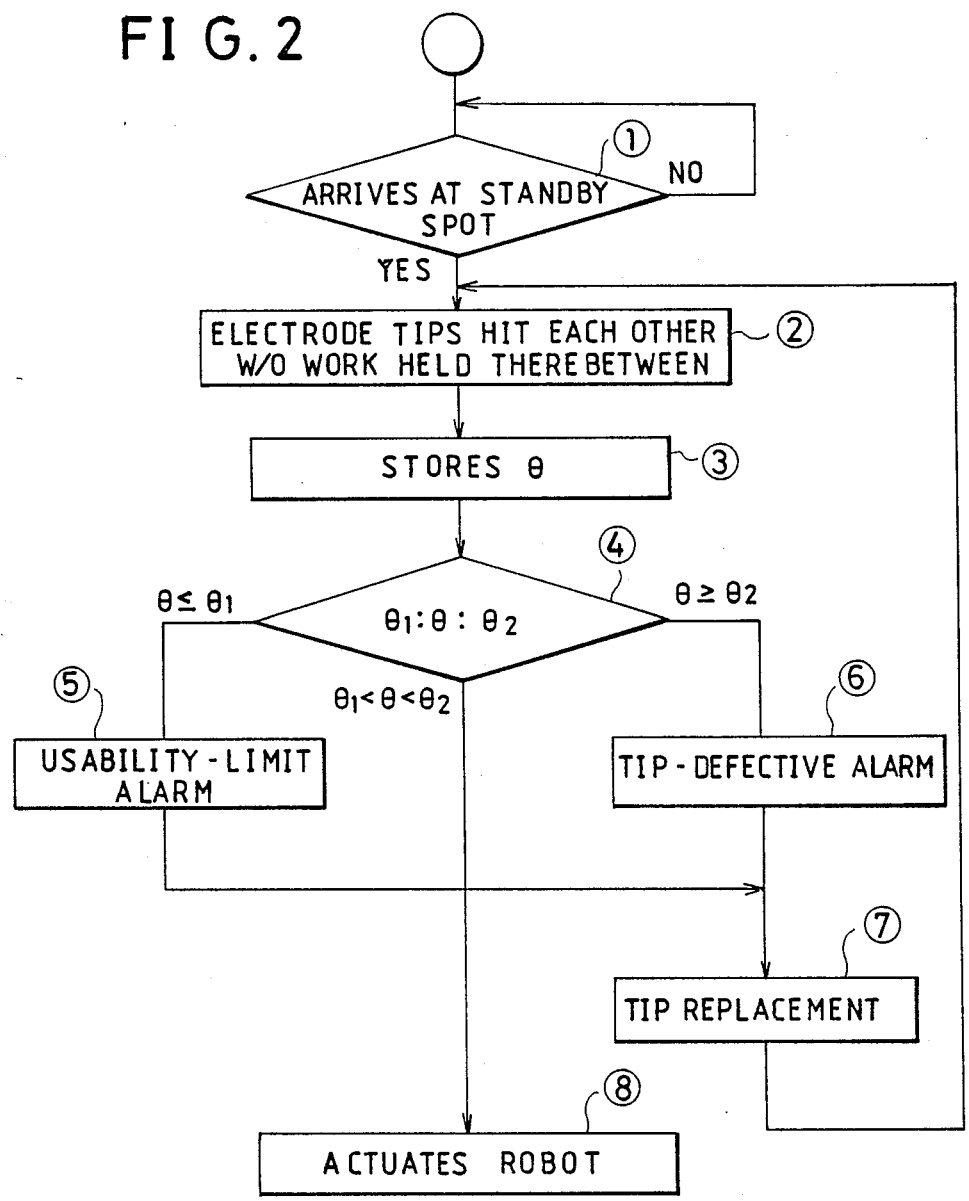

METHOD OF CONTROLLING ELECTRODE TIP OF WELDING GUN IN AUTOMATIC WELDING MACHINE

BACKGROUND OF THE INVENTION

This invention relates to an electrode tip control method for a welding gun in an automatic welding machine in which the welding gun is moved by a robot successively to a plurality of welding spots on work-in-progress.

In a conventional automatic welding machine, it has been usual to count the number of units of work-in-progress on which a particular electrode tip has been used to perform welding. The tip of the electrode is then reformed by a tip dresser at intervals of a specified number of the welded units. The tip is considered to have come to its usability limit when reformed for a predetermined number of times, and is then replaced with a new one.

An electrode tip is conventionally reformed as follows. The top of the electrode tip which has become enlarged in diameter as a result of the wear during use is cut into a tapered shape until it is reformed to the specified diametral value. The amount of cutting varies depending on the degree of wear of the tip. For this reason, the tip length is not necessarily the same for the electrode tips which have been reformed for the same number of times, so that some of them still retain a usable tip length even after being reformed for the predetermined number of times. Therefore, when an electrode tip is replaced with a new one just because it has been reformed for the predetermined number of times as in the foregoing method, it is possible to throw away a still usable electrode tip, thus resulting in waste.

In view of this problem, it is an object of the present invention to provide an electrode tip control method wherein waste resulting from a premature replacement of an electrode tip is avoided by accurately determining whether or not the actual tip length has become shortened to the usability limit thereof.

SUMMARY OF THE INVENTION

To achieve the above object, the present invention provides an electrode tip control method for a welding gun in an automatic welding machine in which the welding gun having a pair of gun arms each equipped with an electrode tip is moved by a robot successively to a plurality of welding spots on units of work-in-progress, said electrode tip control method comprising the steps of: setting a lower-limit opening degree value of the welding gun equal to an opening degree of said welding gun observed when the welding gun with electrode tips whose lengths have been reduced to the usability limit thereof is closed with no work clamped between the electrode tips; closing the welding gun with no work clamped between the electrode tips before actually performing welding at the first welding spot so as to detect by an opening degree sensor provided in the welding gun an actual opening degree value of the welding gun then observed; and comparing the detected opening degree value with the lower-limit opening degree value to determine whether it is necessary to replace the electrode tip with a new one. Further, it may be so arranged as to comprise an additional step of setting an upperlimit opening degree value of the welding gun equal to an opening degree, plus an allowable error, of the welding gun observed when the welding gun with new electrode tips of regular dimensions is closed with no work clamped between the electrode tips, so that an alarm is operated to indicate presence of a defective electrode tip when said detected opening degree value is larger than said upper-limit opening degree value.

When the tip length of an electrode tip is large enough to be usable, the detected opening degree value is larger than the lower-limit opening degree value, so that the electrode tip is replaced with a new one only when the detected opening degree value is smaller than the lower-limit opening degree value, thus doing away with possibility of wastefully throwing away a still usable electrode tip.

In addition, if a new electrode tip replacing the old one is defective and thus too long or not properly inserted in place, the detected opening degree value is larger than the upper-limit opening degree value, in which case the alarm is operated to indicate presence of a defective electrode tip.

BRIEF DESCRIPTION OF THE DRAWINGS:

The above and other objects and the attendant advantages of the present invention will become readily apparent by reference to the following detailed description when considered in conjunction with the accompanying drawings wherein:

FIG. 2 is a flowchart showing the control program for the welding gun before starting the welding.

DETAILED DESCRIPTION OF A PREFERRED EMBODIMENT

Figure 1:
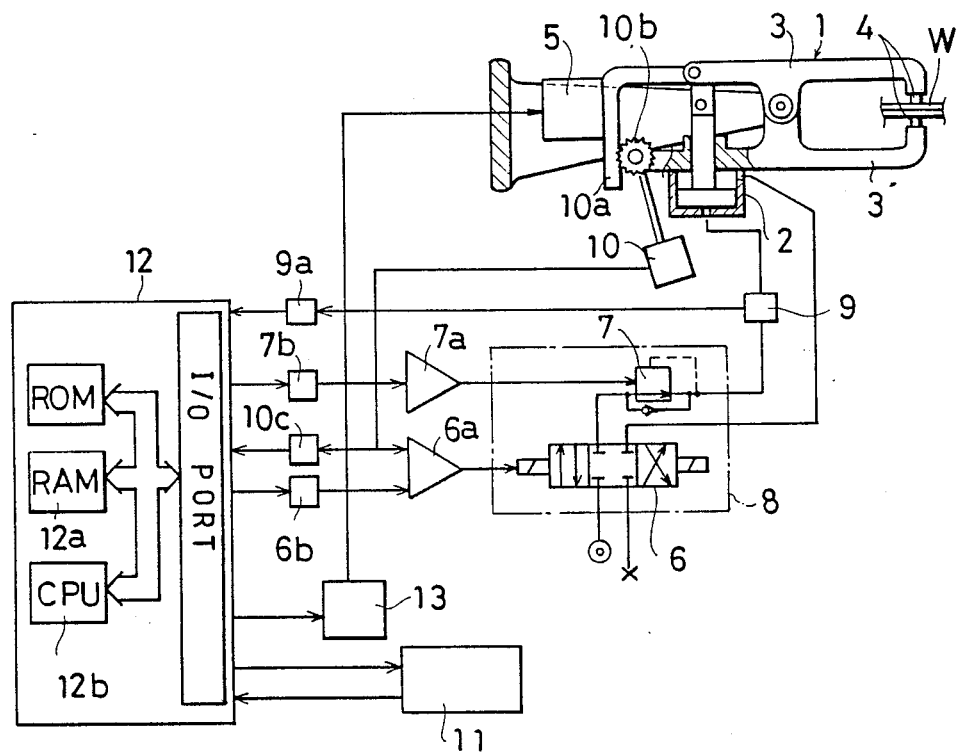
FIG. 1 is a schematic diagram showing an apparatus to carry out one embodiment of this invention.

Referring to FIG. 1, an X-type welding gun 1 has a pair of gun arms 3, 3 which are opened and closed by a pressure cylinder 2. The welding gun 1 is moved successively to a plurality of welding spots on the unit W of work-in-progress by a robot (not shown). At each spot, the gun arms 3, 3 are closed to grip the unit W between the electrode tips 4, 4 mounted at the front ends of the arms. The grip is then tightened by pressure. The electrode tips 4, 4 are then energized through a welding transformer 5 to perform spot welding on the unit W.

The pressure cylinder 2 consists of a double acting air cylinder which is controlled by a pneumatic pressure servo circuit 8 equipped with a servo valve 6 controlled by a servo amplifier 6a and with a regulator 7 controlled by a drive amplifier 7a. A pressure sensor 9 is provided in the pressure cylinder 2 to detect the clamping or welding pressure of the welding gun 1 from the pressure in one of the air chambers of the pressure cylinder 2 which is pressurized when the gun arms 3, 3 are closed. The welding gun 1 is further provided with an opening degree sensor 10 which detects the opening degree of the gun arms 3, 3 from the rotating angle of a pinion 10b on one of the gun arms 3 that is in mesh with a rack 10a interlocked with the other gun arm 3.

A robot controller 11 is connected to a gun controller 12 consisting of a microcomputer. When arrival at a welding spot of the welding gun 1 is confirmed with the signal from the robot controller 11, the pressure instruction signal and the pressure setting signal from the gun controller 12 are inputted respectively into the servo amplifier 6a and the drive amplifier 7a through D/A converters 6b, 7b and air is supplied to the pressure cylinder 2 through the servo valve 6 and the regulator 7 in order to close the gun arms 3, 3. When it is confirmed through the signal inputted from the pressure sensor 9 via an A/D converter 9a that the pressure has risen to the set pressure level, a transformer drive circuit 13 is actuated with the signal from the gun controller 12 so as to energize the electrode tips 4, 4 for a predetermined length of time. With lapse of the hold time following completion of the energization, the release instruction signal from the gun controller 12 is imputed into the servo amplifier 6a to open the gun arms 3, 3. When it is confirmed through the signal inputted from the open degree sensor 10 via an A/D converter 10c that the gun arms 3, 3 are open to the predetermined opening degree, the welding-completion signal is sent from the gun controller 12 to the robot controller 11 to operate the robot and thereby move the welding gun 1 to the next welding spot for performing welding in the same manner as the foregoing. After completing welding at the last welding spot on the unit of work-in-progress, the welding gun is moved to the standby spot some distance away from the work-setting location.

Further, the number of units welded are counted and when the number thereof amounts to the predetermined number of the welded units, the welding gun 1 is moved to the reforming site (not shown) where a tip dresser is disposed. After having the electrode tip 4 reformed there, the welding gun 1 is further moved to the standby spot.

FIG. 2 shows the control program controlling operation of the welding gun 1 from after moving to the standby spot up to starting to perform welding on the next unit of work-in-progress, as described in the following.

When it is confirmed with the signal from the robot controller 11 that the welding gun 1 has arrived at the standby spot (step 1), the pressure instruction signal from the gun controller 12 is inputted into the servo amplifier 6a and air is supplied to the pressure cylinder 2 to close the gun arms 3, 3 of the welding gun 1 with no work clamped therebetween (step 2).

Figures 3A, 3B:
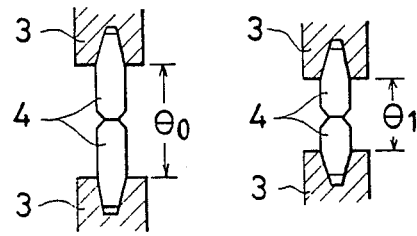
FIGS. 3(a) and 3(b) are diagrams illustrating the change in the opening degree of the gun arms when closed with no work clamped therebetween.

FIG. 3a shows a condition in which the gun arms 3, 3 carrying new electrode tips 4, 4 of regular dimensions are closed with no work clamped therebetween. An opening degree of the gun arms 3, 3 observed in this condition is taken as the reference opening degree value $\theta_0$. The lower-limit opening degree value $\theta_1$ is then taken as one representing an opening degree of the gun arms 3, 3 observed when the gun arms 3, 3 carrying the electrode tips whose lengths have decreased to the usability limit thereof are closed with no work clamped therebetween as shown in FIG. 3(b). There is further set the upper limit opening degree value $\theta_2$ which represents the reference opening degree value $\theta_0$ plus an allowable error. These opening degree values $\theta_1$ and $\theta_2$ are then stored in a RAM 12a of the gun controller 1.

In addition, the actual opening degree $\theta$ of the gun arms 3, 3 detected by the opening degree sensor 10 when the gun arms are closed with no work clamped therebetween as described in the foregoing is also stored in the gun controller 12 (step 3), and CPU 12b compares it with $\theta_1$ and $\theta_2$ to determine whether or not the electrode tips are usable (step 4).

In this case, if the length of the electrode tip 4 has been reduced to the usability limit thereof, that is, $\theta \leq \theta_1$, a usability limit alarm is actuated (step 5). If the new electrode tip 4 is defective and thus too long or not properly inserted in place, $\theta \geq \theta_2$ and a tip-defective alarm is actuated (step 6). Thereafter, the electrode tip 4 is replaced manually or automatically with a new one (step 7), the gun arms with new tips are again closed with no work clamped therebetween to obtain a new $\theta$, which is then stored and compared to determine usability thereof as described above.

When $\theta$ falls within the allowable range, that is, $\theta_1 < \theta < \theta_2$, the signal permitting the robot to be actuated is sent from the gun controller 12 to the robot controller 11 and, after completion of the work setting operation at the work setting location, the robot is actuated to perform welding on the unit of work-in-progress (step 8).

As is clear from the above description, according to the method of the present invention, whether or not the length of an electrode tip has decreased to the usability limit thereof is determined accurately so that it is possible to utilize an electrode tip to its very usability limit, thereby reducing waste and running cost. In addition, according to the method as further described, it is possible to find whether an electrode tip is too long or so defective as not to be properly inserted into the gun arm, so that welding with a welding gun carrying a defective electrode can be prevented.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An electrode tip control method for a welding gun in an automatic welding machine in which the welding gun having a pair of gun arms each equipped with an electrode tip is moved by a robot successively to a plurality of welding spots on units of work-in-progress, said electrode tip control method comprising the steps of:

setting a lower-limit opening degree value of the welding gun equal to an opening degree of said welding gun observed when the welding gun with electrode tips whose lengths have been reduced to the usability limit thereof is closed with no work clamped between the electrode tips;

closing the welding gun with no work clamped between the electrode tips before actually performing welding at the first welding spot so as to detect by an opening degree sensor provided in the welding gun an actual opening degree of the welding gun then observed; and comparing this detected opening degree with the lower-limit opening degree value to determine whether it is necessary to replace the electrode tip with a new one.

2. An electrode tip control method for a welding gun in an automatic welding machine as set forth in claim 1, wherein an opening degree, plus an allowable error, of the welding gun observed when the welding gun with new electrode tips of the regular dimensions is closed with no work clamped between the electrode tips is set as the upper-limit opening degree value of the welding gun, so that an alarm is operated to indicate presence of a defective electrode tip when the foregoing detected opening degree is larger than said upper-limit opening degree value.

* * * * *